(12) United States Patent
Sanders

(10) Patent No.: US 9,277,744 B1
(45) Date of Patent: Mar. 8, 2016

(54) LANYARD GAME STRAP

(71) Applicant: Hunter Kane Sanders, Owasso, OK (US)

(72) Inventor: Hunter Kane Sanders, Owasso, OK (US)

(*) Notice: Subject to any disclaimer, the term of this patent is extended or adjusted under 35 U.S.C. 154(b) by 0 days.

(21) Appl. No.: 14/514,946

(22) Filed: Oct. 15, 2014

Related U.S. Application Data

(60) Provisional application No. 61/980,084, filed on Apr. 16, 2014.

(51) Int. Cl.
*A01M 31/00* (2006.01)

(52) U.S. Cl.
CPC .................................. *A01M 31/006* (2013.01)

(58) Field of Classification Search
CPC .. A01M 31/00; A01M 31/006; A01M 31/008
See application file for complete search history.

(56) References Cited

U.S. PATENT DOCUMENTS

| | | | |
|---|---|---|---|
| 3,096,010 A | 7/1963 | Rasmussen | |
| 3,968,670 A * | 7/1976 | Quenot | 70/456 R |
| 4,327,850 A * | 5/1982 | Robinson, Jr. | 224/103 |
| D278,456 S * | 4/1985 | Lewis | D22/199 |
| 4,733,808 A | 3/1988 | Turner, Jr. et al. | |
| 5,111,981 A | 5/1992 | Allen | |
| 5,806,732 A | 9/1998 | Hensley | |
| 5,941,437 A * | 8/1999 | Okumura | 224/585 |
| D414,602 S | 10/1999 | Bolen et al. | |
| 5,988,469 A | 11/1999 | Musacchia | |
| 6,036,066 A | 3/2000 | Giacona, III | |
| 6,213,295 B1 | 4/2001 | Hohn | |
| 6,533,151 B1 * | 3/2003 | Link | 224/251 |
| 6,572,430 B1 | 6/2003 | Primos | |
| 6,575,804 B1 | 6/2003 | Primos | |
| 6,675,446 B2 | 1/2004 | Buettell | |
| 6,923,356 B2 * | 8/2005 | Reynolds | 224/585 |
| 6,926,578 B1 | 8/2005 | Casias et al. | |
| 7,927,172 B1 | 4/2011 | Kirby et al. | |
| D654,639 S * | 2/2012 | Huber et al. | D30/153 |
| 8,277,275 B2 | 10/2012 | Drury | |
| D677,842 S * | 3/2013 | Kalbach | D30/153 |
| 8,505,114 B1 * | 8/2013 | Earley | 2/94 |
| D695,469 S * | 12/2013 | Dougherty et al. | D30/153 |
| 8,622,782 B2 | 1/2014 | Fulcher | |
| 2002/0108978 A1 * | 8/2002 | Koxlien | 224/258 |
| 2003/0141325 A1 * | 7/2003 | Balogh, II | 224/101 |
| 2005/0017043 A1 * | 1/2005 | Link et al. | 224/674 |
| 2005/0173477 A1 * | 8/2005 | Scott | 224/148.6 |
| 2008/0283651 A1 * | 11/2008 | Ito et al. | 242/386 |

* cited by examiner

*Primary Examiner* — Brian D Nash
(74) *Attorney, Agent, or Firm* — Molly D. McKay

(57) ABSTRACT

The present invention is a lanyard game strap, hauler or tote that can be worn around the neck of a hunter. The strap, hauler or tote contains one type of attachment means for holding both game calls and another type of attachment means for holding game. Several of each type of attachment means are attached to each strap, hauler or tote. The lanyard game strap, hauler or tote is preferably stretchable so as to be comfortable to wear around the neck even when game is attached to the lanyard game strap, hauler or tote that increases the total weight being carried around the hunter's neck.

5 Claims, 3 Drawing Sheets

LANYARD GAME STRAP

CROSS-REFERENCE TO RELATED APPLICATIONS

The present application claims priority to U.S. Provisional Patent Application Ser. No. 61/980,084 for Lanyard Game Strap filed on Apr. 16, 2014.

BACKGROUND OF THE INVENTION

1. Field of the Invention

The present invention relates to a lanyard game strap, hauler or tote for wearing around the neck of a hunter that provides attachment means thereon for holding both game calls and game such as waterfowl game birds.

2. Description of the Related Art

Currently there are lanyards that have attachment means for multiple game calls. Also, currently there are straps that can be attached to the garments of a hunter or held in the hunter's hand with attachment means for holding game such as waterfowl game birds. It would be desirable to have a lanyard game strap, hauler or tote that could be worn around the neck of a hunter that would have attachment means for holding both game calls and game such as waterfowl game birds. The present invention addresses that need.

SUMMARY OF THE INVENTION

The present invention is a lanyard game strap, hauler or tote that can be worn around the neck of a hunter that contains attachment means for holding both game calls and other attachment means for holding game such as waterfowl game birds. The lanyard game strap, hauler or tote is preferably stretchable so as to be comfortable to wear around the neck even when game such as waterfowl game birds is attached to the lanyard game strap, hauler or tote that increases the total weight being carried around the hunter's neck.

DETAILED DESCRIPTION OF THE PREFERRED EMBODIMENT

Figure 1:
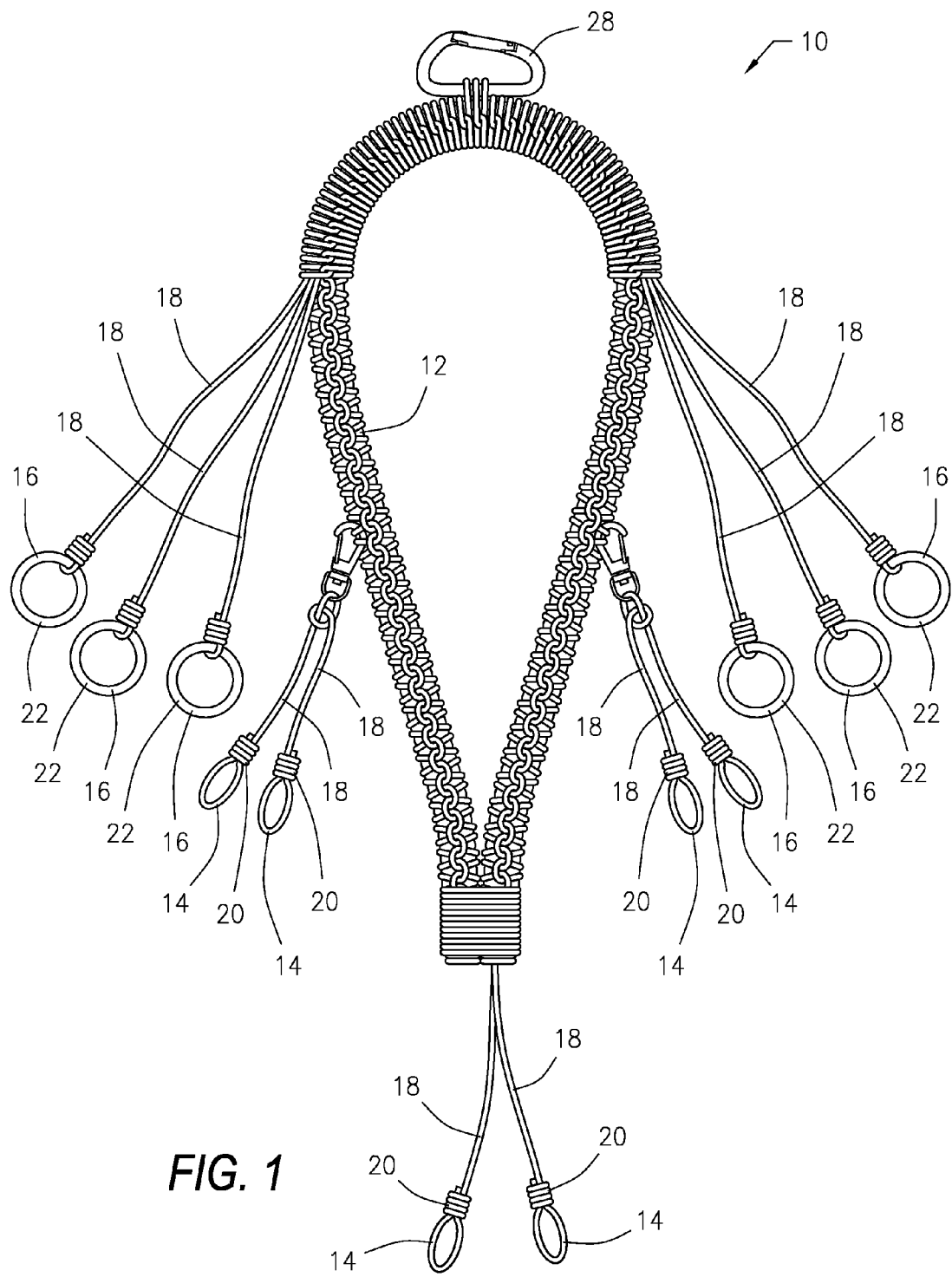
FIG. 1 is perspective view of a lanyard game strap, hauler or tote constructed in accordance with a preferred embodiment of the present invention.

Referring now to the drawings and initially to FIG. 1, there is illustrated a lanyard game strap, hauler or tote 10 that is constructed in accordance with a preferred embodiment of the present invention. The lanyard game strap, hauler or tote 10 is in the form of a closed loop 12 that can be slipped over the head of a hunter and can be worn around the neck of the hunter. Preferably, the closed loop 12 is constructed of braided material that is comfortable to wear.

Figures 2, 3:
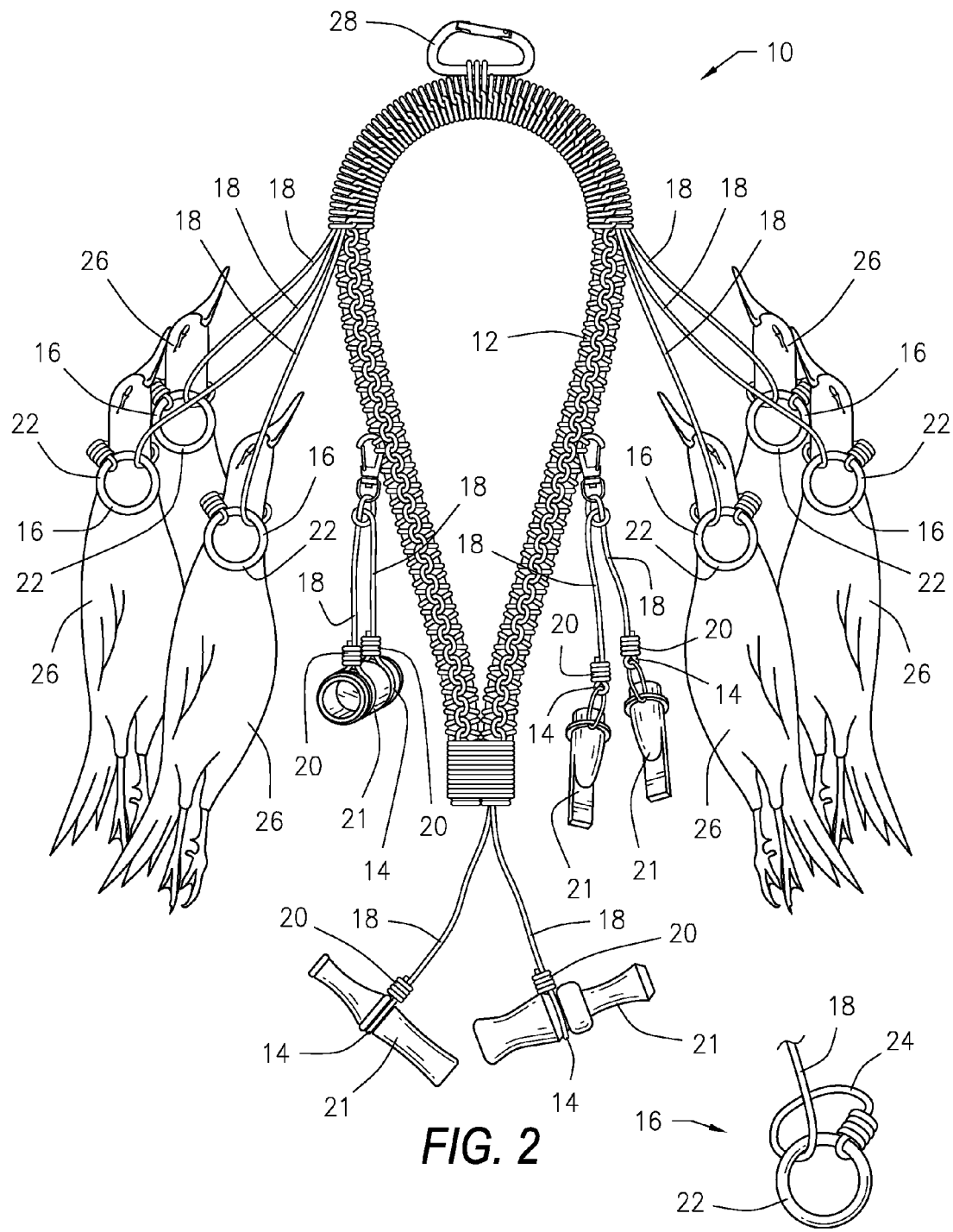
FIG. 2 is the lanyard game strap, hauler or tote of FIG. 1 shown with game calls and game such as waterfowl game birds attached.
FIG. 3 is an enlarged view of a game attachment means.

Referring also to FIG. 2, the lanyard game strap, hauler or tote 10 is provided with two types of attachment means 14 and 16 attached to it by means of cords 18. One attachment means 14 is a cinchable loop 20 for holding game calls 21.

Referring to FIG. 3, the other attachment means 16 is a ring 22 through which the cord 18 that attaches the ring 22 to the closed loop 12 can be pulled to form a loop 24 for engaging the neck or other suitable appendage of game such as waterfowl game birds 26 as a means of holding the game such as waterfowl game birds 26. Multiple game call attachment means 14 and multiple game attachment means 16 are preferably provided on each lanyard game strap, hauler or tote 10 so that a given lanyard game strap, hauler or tote 10 can hold multiple game calls 21 and multiple game such as waterfowl game birds 26 simultaneously.

The closed loop 12 of the lanyard game strap, hauler or tote 10 is preferably constructed of stretchable material so as to be comfortable to wear around the neck even when game such as waterfowl game birds 26 is attached to the lanyard game strap, hauler or tote 10 that increases the total weight being carried around the hunter's neck.

The lanyard game strap, hauler or tote 10 is provided with a retaining clamp 28 at the back of the closed loop 12 that can be opened and closed. The retaining claim 28 is designed to hold attachment means for game 16 up and out of the hunter's way until they are needed by the hunter to secure game 26 to them at which time the attachment means for game 16 is released from the retaining clamp 28 so that the attachment means for game 16 and the attached game 26 can hang down in front of the hunter on the lanyard game strap, hauler or tote 10.

Figure 4:
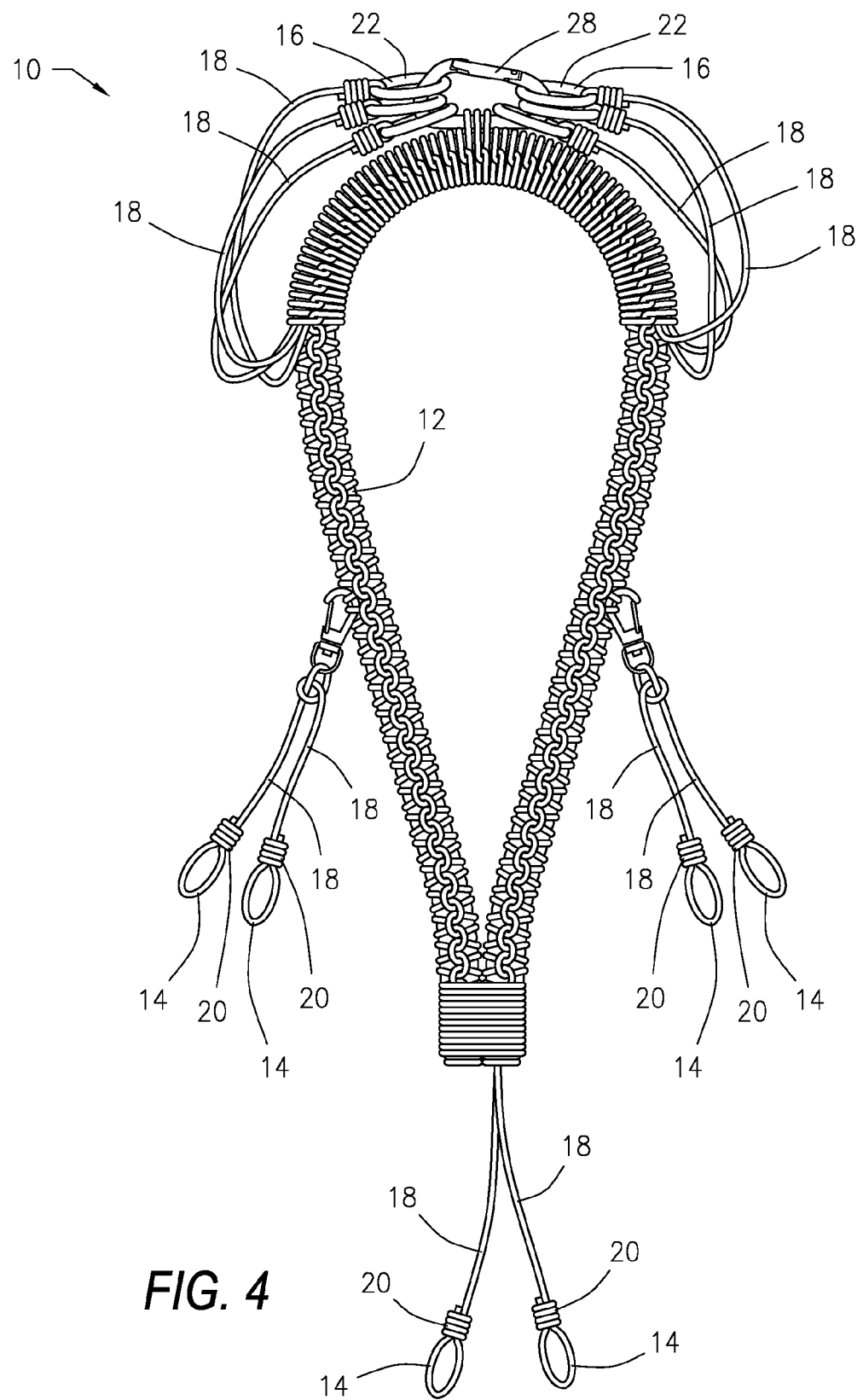
FIG. 4 is a perspective view of the lanyard game strap of FIG. 1 shown with the game attachment means secured to a clip at the rear of the strap to hold them out of the way when not needed for attaching birds thereto.

Referring now to FIG. 4, the lanyard game strap, hauler or tote 10 is shown with the attachment means for game 16 secured to the retaining claim 28 to hold the attachment means of game 16 out of the way until they are needed by the hunter to secure game 26 to them.

While the invention has been described with a certain degree of particularity, it is manifest that many changes may be made in the details of construction and the arrangement of components without departing from the spirit and scope of this disclosure. It is understood that the invention is not limited to the embodiments set forth herein for the purposes of exemplification, but is to be limited only by the scope of the attached claim or claims, including the full range of equivalency to which each element thereof is entitled.

What is claimed is:

1. A lanyard game strap comprising:
   a closed loop sufficient in size to be slipped over the head of a hunter so that the closed loop can be worn around the neck of the hunter while hunting,
   multiple cinchable loops for holding game calls attached to the closed loop,
   multiple rings which serve as game attachment means attached to the closed loop, and
   a retaining clamp attached at a back of the closed loop, said retaining clamp capable of being opened and closed, said rings that serve as game attachment means removably securable to said retaining clamp to hold said game attachment means out of the hunter's way until they are needed to secure game.

2. A lanyard game strap according to claim 1 further comprising:
   each said cinchable loop secured to said closed loop by a separate cord.

3. A lanyard game strap according to claim 2 further comprising:
   each ring that serves as a game attachment means secured to said closed loop by additional separate cord.

4. A lanyard game strap according to claim 3 wherein said closed loop is constructed of stretchable material so as to be comfortable to wear around the neck of a hunter.

5. A lanyard game strap according to claim 1 wherein the closed loop is a braided material into which the cords that secure the rings are woven as a means of securing the rings to the closed loop.

\* \* \* \* \*